United States Patent [19]
Burgsdorf et al.

[11] 4,082,962
[45] Apr. 4, 1978

[54] DEVICE FOR MELTING THE ICING BY DIRECT CURRENT ON CONDUCTORS OF OVERHEAD POWER TRANSMISSION LINE

[76] Inventors: Vladimir Vladimirovich Burgsdorf, ulitsa Krasina, 19, kv. 129, Moscow; Georgy Andreevich Genrikh, ulitsa Chekistov, 10, kv. 3, Lvov; Leonid Alexeevich Nikonets, Khasanskaya ulitsa, 8, kv. 4, Lvov; Valery Vasilievich Mishin, ulitsa Suvorova, 25, kv. 42, Lvov; Viktor Yakovlevich Kuznetsov, ulitsa Popovicha, 110, kv. 20; Anatoly Dmitrievich Kondratiev, ulitsa Mira, 182, kv. 25, both of Juzhno-Sakhalinsk, all of U.S.S.R.

[21] Appl. No.: 814,277

[22] Filed: Jul. 11, 1977

[51] Int. Cl.² .............................................. H02B 1/00
[52] U.S. Cl. .................................... 307/147; 219/209
[58] Field of Search ............... 219/209; 307/119, 147, 307/149, 146, 112; 340/234; 343/704; 244/134 D; 191/62; 104/279; 174/40 R

[56] References Cited

U.S. PATENT DOCUMENTS

| 2,240,772 | 6/1941 | Hampe et al. | 307/147 |
| 2,870,311 | 1/1959 | Greenfield et al. | 219/209 X |

*Primary Examiner*—Robert K. Schaefer
*Assistant Examiner*—Morris Ginsburg
*Attorney, Agent, or Firm*—Lackenbach, Lilling & Siegel

[57] ABSTRACT

The device for melting the icing by direct current through conductors of an overhead power transmission line comprises a rectifier coupled during the ice melting period by its lead-out wires to the disconnected conductor of the power transmission line, a ground wire, and a current filter set in resonance to the line at the commercial frequency, which is, for example, a capacitor bank connected in series to a reactor, whose lead-out wires are connected in parallel to the direct-current voltage lead-out wires of said rectifier.

This device can be used to melt the icing by direct current through conductors and cables of overhead power transmission lines within a voltage range from 110 to 220 kv and more.

16 Claims, 14 Drawing Figures

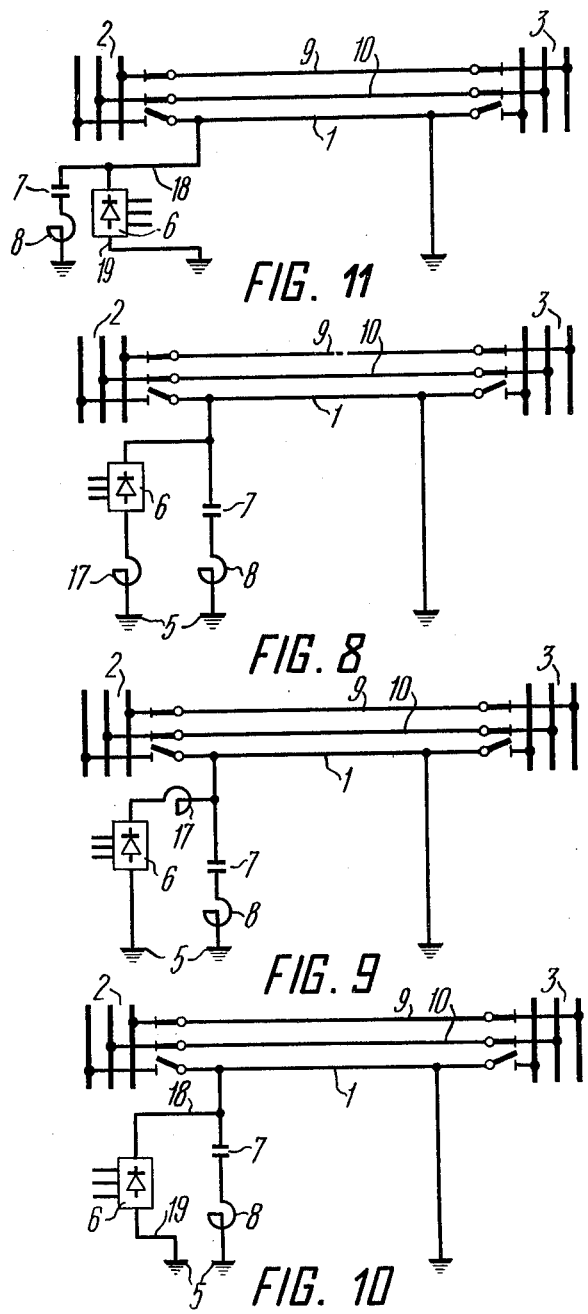

DEVICE FOR MELTING THE ICING BY DIRECT CURRENT ON CONDUCTORS OF OVERHEAD POWER TRANSMISSION LINE

The present invention relates to electrical power engineering and, in particular, to a device for melting the icing by direct current and can be employed for direct current ice melting on conductors and cables of overhead power transmission lines.

There is known a device for melting the icing by direct current through conductors of overhead power transmission lines, including transformers coupled to the lines and grounded neutral wires, which comprises a rectifier coupled to the heated circuit made up of the phase (or conductor) disconnected for ice melting and the grounding means of terminal substations. The voltage of the rectifier is several magnitudes below the voltage of the overhead power transmission line.

Ice melting by means of such devices presents no special technical difficulties in lines up to 35 kv, inclusive.

With higher voltage lines, up to 110–220 kv and more, difficulties arise due to the induced current and voltage of the commercial, that is power-circuit, frequency of the still operating lines.

When conductors of the ice melting line are disconnected phase by phase, the line operates incompletely since only conductors of two phases remain operational, whereas conductors of the third phase are connected to the ice melting circuit. EMF is induced in the conductor connected to the ice melting circuit due to electromagnetic and electrostatic interferences of the two operating phases. As a result current in the ice melting circuit comprises two distinct components: a permanent component caused by the rectifier EMF and an alternating component of the commercial (power-circuit) frequency caused by the induced EMF.

The EMF and the variable component of the rectified current induced in the melting circuit of lines using up to 35 kv, inclusive, are not dangerous for 10 kv rectifiers employed for ice melting. For 110 kv or greater lines these induced currents and voltages are dangerous and inadmissible for such rectifiers and their supply transformers. It becomes impossible to use 10-35 kv rectifier bridges and, sometimes, to melt the ice by means of phase by phase disconnection of 110 kv or greater lines.

Besides, in such devices overvoltages tend to appear on valves and insulation of the rectifier, when it is put in and out of operation.

When the ice melting circuit is connected (the rectifier is put into operation), the induced alternating electromotive force whose polarity is the opposite of the valve conduction is applied to the lead-outs of the non-conducting rectifier. The open circuit voltage reaches several tens of thousands volts, which can be dangerous both for the valves and for the insulation of the rectifier. The other half-wave of the induced electromotive force coincides with the valve conduction direction and causes current pulsations in the ice melting circuit. In this case it is only the voltage drop on valves and connecting wires of the rectifier that is applied to the valves and insulation of the rectifier.

When the rectifier is put out of operation and its supply of alternating current is cut off, the rectified current drops to zero. All the induced electromotive force in the line conductor is then also applied to the valves and insulation of the rectifier, when its polarity is opposite to the valve conduction. This electromotive force is not dangerous for the installation in the other half-period.

As a result, the large induced electromotive force, especially when short circuit currents flow through the operating conductors of the line, requires that the number of series-connected valves in the rectifier arms be increased and its insulation be strengthened, that is the rectifier is to be made more powerful.

When some phase is inoperative in the line during ice melting, the alternating electromotive force induced in the disconnected conductor is the cause of the melting current variable component. In this case the rectified current of the rectifier is pulsing and the pulsation frequency is equal to the power-circuit frequency. Such pulsations of the rectifier current result in direct components of the rectifier phase currents and, consequently, in the windings of the transformer supplying the rectifier. Direct current components lead to a constant uncompensated magnetization fluxes, an increase of the magnetization current and losses of power and energy in the steel of the rectifier supplying transformer.

Such magnetization becomes dangerous when the amplitude of the variable component in the rectified current does not exceed the relative nominal transformer current by 5 or more percent, but is within the limits of 5 or more percent relative to normal transformer current. The transformer cannot be allowed to operate under such conditions.

It is an object of this invention to eliminate the above listed drawbacks.

Another object of this invention is to cut down overvoltages on the valves and insulation of the rectifier, which are produced when it is put in and out of operation.

Yet another object of the invention is to prevent the alternating current of the ice melting circuit from flowing through the rectifier.

This is achieved by a commercial (power-line) frequency current filter connected in parallel to the direct-current voltage lead-out wires of the rectifier.

The current filter is advisable to be made of at least one capacitor and at least one reactor connected in series.

In addition, in order to reduce the stored power and, consequently, the price of the filter elements, it is advantageous to connect a discharger, e.g. a spark discharger, parallel to one of the filter elements; and in order to increase the reliability of operation it is advisable to connect a switchgear device parallel to the filter, said device being turned on at the moment when said discharger operates.

The above listed objects are also achieved by connecting the filter reactor in series with the capacitor via the matching transformer.

It is also advantageous to connect at least one resistance between the lead-out wires of the current filter and the direct current lead-out of the rectifier.

The resistance can be connected either between the potential ungrounded lead-out of the rectifier and the junction point where the filter is joined to the line, or between the lead-out wire of the rectifier and the ground, or, when two resistances are used, one resistance can be connected between the potential lead-out of the rectifier and the current filter and the other resistance between the other lead-out of the rectifier and the second lead-out wire of the filter.

Reactors, conductors, cables of other overhead lines leading from the busbars of the substation where the rectifier is installed, or reactors of the current filter can be used as a current-limiting resistance.

These objects are also achieved by connecting a commercial frequency voltage source, whose phase and voltage can be regulated, in series with the circuit of the filter.

The most advantageous device which can be used as said voltage source is a single-phase transformer whose primary winding is connected in tandem with the neutral lead-out of the high-voltage winding of the transformer (autotransformer) coupled to the two operating phases of the heated line.

In order to more accurately compensate the alternating induced current in the direct current circuit of the rectifier it is advantageous to connect a matching complex load parallel to the secondary winding of said single-phase transformer, the parameters of said load being determined by the nature of the unbalance of the commercial frequency filter elements.

The disclosed device permits ice melting by means of phase-by-phase disconnection of conductors of the 110 kv or greater line using industrially produced power rectifying bridges of the 10 kv and 35 kv classes.

The filter is installed parallel to the rectifier from the direct current side and this ensures a by-pass for the melting current variable component in the conductor. As a result the rectifier current becomes more ideally smoothed and there are not direct components in the rectifier phase currents, and magnetization of the supply (anode) transformer is completely eliminated.

Moreover, the alternating induced electromotive force results in producing current in the circuit consisting of the disconnected conductor, the filter, ground and the disconnected conductor. Since the filter is tuned in resonance to the power-line frequency, the voltage drop thereupon caused by the current produced by the induced electromotive force is insignificant (equal to zero in an ideal case) and, consequently, overvoltages produced in the rectifier, when it is put into and out of operation, are eliminated.

The invention will now be described with reference to a specific embodiment thereof, taken in conjunction with the accompanying drawings, wherein:

FIGS. 8 and 9 are schematic circuit diagrams of devices, wherein resistances are reactors connected respectively, between the ground and a pole of the rectifier, and between the potential direct-current voltage lead-out of the rectifier and the junction point where the filter is joined to the heated circuit;

FIG. 10 is a schematic circuit diagram of a device, wherein the rectifier is installed on a separate supply substation far from the transmitting substation coupled to the ice melting line and is coupled to the melting circuit via connecting lines;

FIG. 11 is a schematic circuit diagram of a device, wherein the rectifier and the filter are mounted on a separate supply substation;

Figure 1:
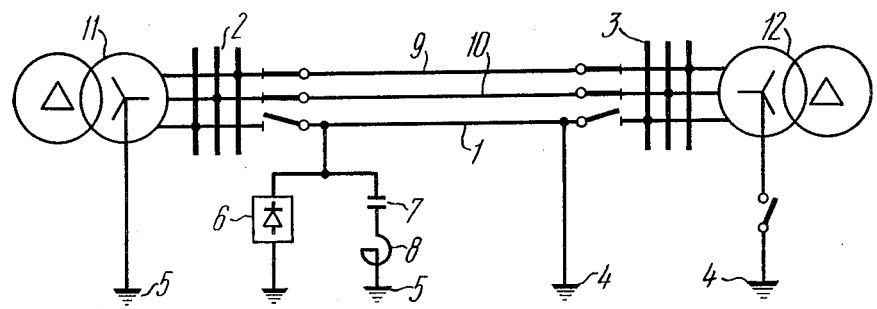
FIG. 1 is a schematic circuit diagram of an ice melting device featuring a commercial frequency filter coupled parallel to the direct-current voltage lead-outs of the rectifier.

Referring to FIG. 1, an overhead ice melting line conductor 1 is disconnected from busbars 2 and 3 of the transmitting and receiving substations and is connected by one end directly to a grounding device 4 and by the other end to a grounding device 5 via a rectifier 6. A current filter comprising a capacitor bank 7 and a reactor 8 is connected parallel to the direct-current voltage lead-out wires of the rectifier. The busbars 2 and 3 of the transmitting and receiving substations are also connected to the operating conductors 9 and 10 and to the transformers (auto-transformers) 11 and 12 provided with neutral wires coupled to the grounding devices 5 and 4, respectively.

FIG. 1 shows the embodiment wherein the filter comprises the capacitor bank 7 and the reactor 8 connected in series and tuned in resonance to the commercial frequency. The reactor can, generally, be made up of several series-connected and parallel-connected reactors. In case a variable current component is present in the melting circuit, only the voltage drop of the variable current component of the filter circuit is applied to the valves and the insulation of the rectifier 6. As the filter is tuned to the commercial frequency in resonance, the voltage drop thereon is close to zero and is determined in the steady-state operation by the effective resistance of the filter only. The bulk of the commercial frequency current flows through the filter bypassing the rectifier 6. The capacitor bank 7 is to be selected with regard to the direct-voltage component equal to the rectified voltage of the rectifier 6.

Direct current is closed through the circuit consisting of the pole of the rectifier 6, the conductor 1 of the line, the ground and the other pole of the rectifier 6.

When short-circuit current flows in the conductors 9 and 10, the voltage on the filter elements increases in proportion with the increase of the induced current in the conductor 1. The lead-out wires of the rectifier 6 receive only the voltage drop on the equivalent resistance of the filter conditioned by the inaccuracy of tuning of its elements and the presence of the reactor's effective resistance.

Figure 2:
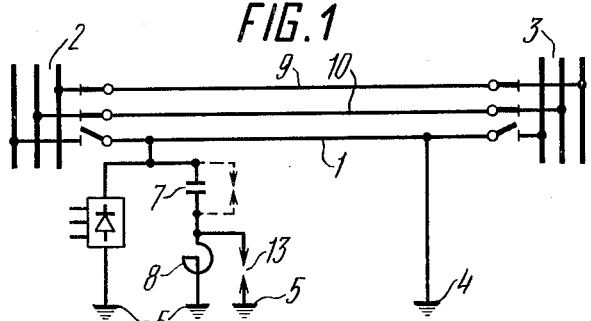
FIG. 2 is a schematic circuit diagram of a device similar to that in FIG. 1 featuring a filter whose one element is shunted by a discharger.

When short circuit currents appear in the operating conductors 9 and 10 of the line, the induced currents in the conductor 1 exceed the induced currents in the normal conditions. Voltages and currents, which the capacitor 7 and the reactor 8 should withstand, increase sufficiently. In order to reduce the installed capacity of the filter elements a discharger 13 (FIG. 2) is set up parallel to one of these elements. It is convenient to set up the discharger 13 parallel to the reactor 8 of the filter, because, when the discharger 13 shunts the capacitor bank 7, a direct current short circuit occurs. When the discharger 13 operates, the total resistance of the filter sharply rises and alternating current is mainly closed through the rectifier 6.

As such a condition is very brief, the resulting magnetization of the transformer (not shown in FIG. 2) supplying the rectifier 6 is not dangerous. Owing to the short distance between the electrodes of the discharger 13, the arc produced when the discharger 13 operates may not cease, which may require in some cases disconnection of the operating conductors 9 and 10 of the line, though the short circuit is eliminated.

Operation of the discharger 13 with the disconnected supply of the rectifier 6 is the most dangerous case in these conditions. There is no place for the induced current to flow and the current through the discharger 13 in such conditions reaches its maximum.

Figure 3:
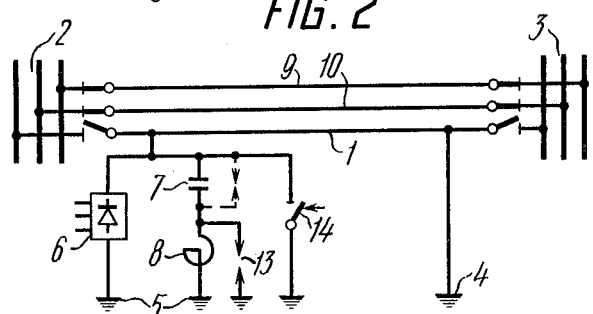
FIG. 3 is a schematic circuit diagram of a device similar to that in FIG. 2, featuring an additional switchgear installation placed in parallel with the filter.

In such situations it is advantageous to use the device of FIG. 3. Here a switchgear device is connected parallel to the current filter to shunt it and in order to do quick switchings in the rectifier supply circuit and thus to increase the reliability of operation of the filter and the dischargers. The command to turn on the switchgear device 14 is fed from the sensors (not shown in FIG. 3) responding to operation of the discharger 13.

Figure 4:
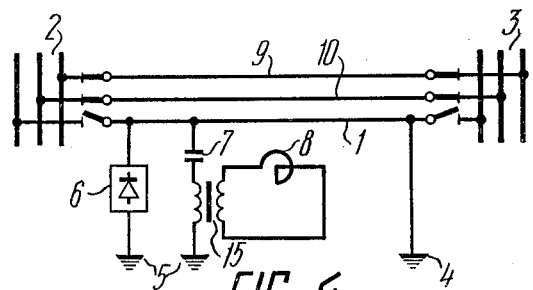
FIG. 4 is a schematic circuit diagram of a device featuring a filter whose reactor is coupled via a matching transformer.

Referring to FIG. 4, the current filter is made up of the capacitor bank 7 and the reactor 8 which is connected in series with said capacitor bank 7 via a matching transformer 15.

Direct current is shorted through the circuit consisting of a pole of the rectifier 6, the conductor 1 of the line, ground and the other pole of the rectifier 6. Alternating current induced in the conductor 1 by the currents of the conductors 9 and 10 is generally shorted in the normal operating conditions through the current filter. The filter currents which do not exceed nominal values should not cause saturation of the magnetic circuit of the transformer 15. When induced current exceeds the nominal value, which may occur during a short circuit, the magnetization current of the transformer 15 rises sharply owing to saturation of the magnetic circuit. In this case the summated induction of the reactor 8 and the transformer 15 drops, which results in mismatching of the filter elements. The total resistance of the filter grows. The paths of shortening induced currents change.

In emergency conditions induced currents flow mainly through the circuit consisting of the conductor 1, the rectifier 6, the winding of the supply transformer (not shown in FIG. 4), the rectifier 6, and ground. Due to the transient nature of the emergency condition, magnetization of the transformer suppying the rectifier is not dangerous.

Referring to FIGS. 5–9, a resistance 16 is included between the lead-out wires of the current filter and lead-outs of the rectifier 6 into the direct current circuit of the rectifier 6 in order to increase the resistance to alternating current. Since the rectifier 6 and the current filter are placed in parallel, the increase of resistance in a branch of the rectifier leads to reduction of the alternating induced current therein and, consequently, to better filtration of said current.

Figure 5:
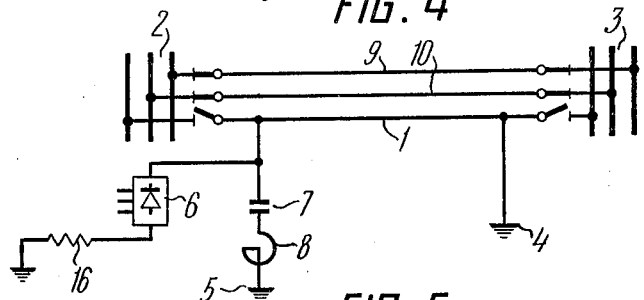
FIG. 5 is a schematic circuit diagram of a device, wherein a resistance is connected between the ground and the direct-current voltage lead-out of the rectifier.

The device of FIG. 5 comprises said resistance 16 connected between the ground and the direct-current voltage lead-out of the rectifier 6. Such design of the device is more advantageous when cables of the overhead power transmission lines are used as the resistance 16. The insulation of the cables is not thick, but is quite sufficient to withstand the voltage drop of the melting current on the cable resistance. It should be noted that the cables can be grounded by connection to grounding devices along the line or at another substation. Connection of cables in accordance with the above described circuit may have the object of heating these cables or melting the ice thereupon.

Figure 6:
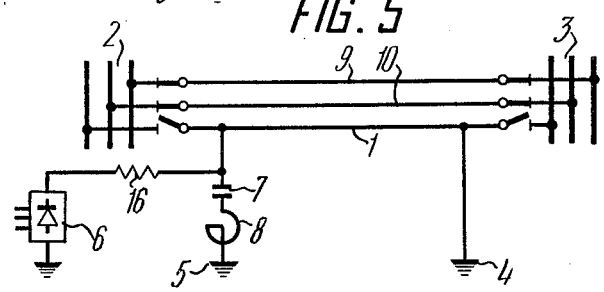
FIG. 6 is a schematic circuit diagram of a device, wherein a resistance is connected between the potential direct-current voltage lead-out of the rectifier and the junction point where the filter is joined to the heated circuit.
Figure 7:
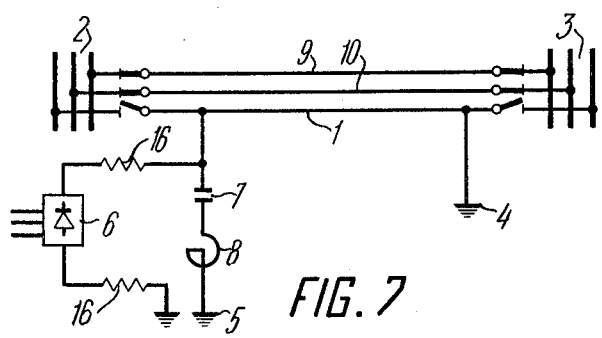
FIG. 7 is a schematic cicuit diagram of a device featuring two current-limiting resistances connected in series with the rectifier from the side of the line and from the side of the ground.

The device of FIG. 6 features a current-limiting resistance 16 connected to the linear (potential) lead-out of the rectifier 6 between said lead-out and the current filter. Conductors of the power transmission lines can be effectively used as said resistance, because their insulation is good enough for the purpose. These may be conductors of some line connecting the transmitting substation, whereto the line to be heated for ice melting with the conductors 1,9,10 leads and where the current filter is installed, with the supply substation, where the rectifier 6 is installed. Conductors of such connecting line may serve as the current-limiting resistance and as a means for joining the rectifier 6 when it is located far from the ice melting line with the conductors 1,9,10. Besides, preventive heating or ice melting can be performed simultaneously on the conductors of the connecting line. In the other case, when the rectifier 6, the current filter and the line comprising conductors 1,9,10 whereon the icing is to be melted are situated at one substation, the resistance 16 may be some other line having lead-outs at said substation, which can be connected between the potential lead-out of the rectifier 6 and the current filter.

In some cases, when there is no one resistance available sufficient for the purpose or due to some other reasons, two current-limiting resistances can be connected. In this case one of them is connected to the rectifier 6 (FIG. 7) on the side of the potential lead-out, that is from the heated conductor 1, and the other to the grounding device 5.

When the ice is melted on conductors of the overhead power transmission line leading from the same substation where the rectifier 6 is installed and conductors or cables of other lines are impossible or inadvisable to use, it is advantageous to employ reactors 17 as resistances, as shown in FIGS. 8 and 9.

The use of the reactors 17 in the direct current circuit leaves the direct current melting condition unaffected but significantly influences current redistribution between parallel branches of the current filter and the rectifier 6. Connection of the reactor 17 between the lead-out of the rectifier 6 and the ground (FIG. 8) permits minimum insulation of the reactor 17, as well as limits overcurrents through the valves of the rectifier 6 during short circuits through the ground to the supply rectifier 6 of the alternating current circuit (not shown in FIG. 8). Connection of the reactor 17 between the potential lead-out of the rectifier 6 and the connecting point of the current filter and the heated circuit (FIG. 9) can be useful, for example, due to conditions of the high-frequency link via the heated conductor of the overhead power transmission line.

The embodiment of the device of FIG. 10 is a typical example of the use of conductors and cables of power transmission lines as current-limiting resistances. There can be no rectifier at the transmitting substation whose busbars 2 are coupled to the power transmission line with the conductors 1,9,10 whereon the icing is to be melted. In this case a rectifier 6 installed at another substation can be used for ice melting. If there exist power transmission lines connecting the supply and transmission substations on some voltage, their conductors and cables can be used both as conductors for coupling the far-away rectifier 6 to the heated line and as current-limiting resistances in order to reduce the variable current component in the rectifier branch. It is evident that for such purposes those lines should be used, whose conductors or cables require preventive heating or ice melting and possess acceptable electrical parameters.

Referring to FIG. 10, conductors 18 of the coupling line are connected between the potential lead-out of the rectifier 6 and the point where the current filter (capacitor 7) is joined to the conductor 1. A conductor or conductors of one phase can be used as the conductors 18, as well as conductors of several phases of the coupling line, which are connected in series or parallel to one another. The functions of the second resistance connected between the other lead-out of the rectifier 6 and the grounding device 5 can be performed by cables 19 of the coupling line or parallel-connected cables of several lines. The cables can be grounded by connecting them to the grounding device 5 of the transmitting substation or by connecting them to other grounding devices available on the line or at other substations. In this case the rectifier 6 and the current filter are situated at different substations.

When it is necessary to install the current filter and the rectifier 6 at one supplying substation and perform phase-by-phase ice melting on the overhead line leading from the busbars of another, that is intermediate, substation, the conductors 18 and the cables 19 of the coupling line can be employed simultaneously for supplying direct-current voltage to the heated circuit (for example, two phases of the coupling line) and for distribution of induced current between parallel-connected branches of the rectifier 6 and the current filter (one phase 18 of the coupling line and its cables 19) as shown in FIG. 11.

Figure 12:
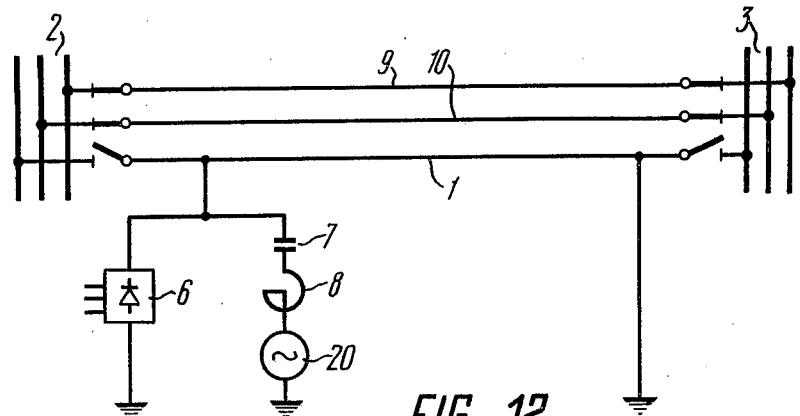
FIG. 12 is a schematic circuit diagram of a device comprising a filter and an adjustable voltage source coupled in series thereto.

The summated uncompensated filter resistance may be the cause of a considerable leak of alternating current into the rectifier branch. In order to compensate for the internal resistance of the filter, it is proposed to connect in series into its circuit a voltage source 20 (FIG. 12). The value and phase of the voltage of the source 20 is conditioned by the load conditions, line parameters and the phase of the induced current. If the phase and magnitude of the voltage of the source 20 are selected correctly, all the induced current is directed to the filter and this is beneficial for the operating conditions of the transformer supplying rectifier 6.

Figure 13:
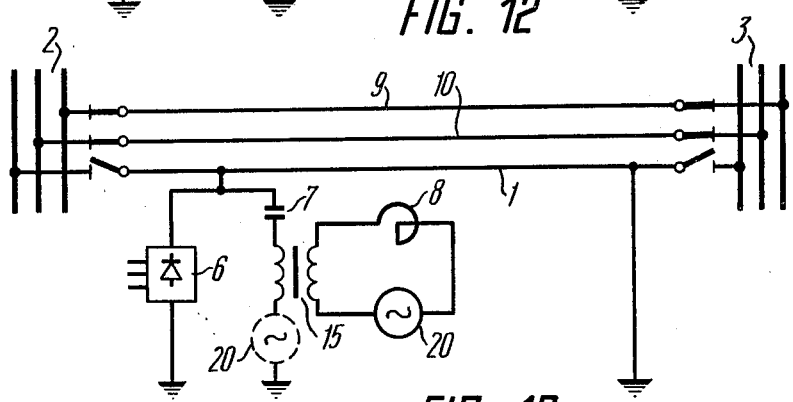
FIG. 13 is a schematic circuit diagram of possible embodiments featuring different ways of connecting the adjustable voltage source in series into the current filter circuit.

Referring to FIG. 13, the device comprises a reactor 8 of the filter which is connected in series with the capacitor 7 via the matching transformer 15. In this case the adjustable voltage source 20 can be connected in two ways. It can be connected in series into the circuit consisting of the capacitor 7 and the primary winding of the transformer 15 (shown by dotted line in FIG. 13); or the source 20 can be connected together with the reactor 8 into the circuit of the secondary winding of the transformer 15.

Figure 14:
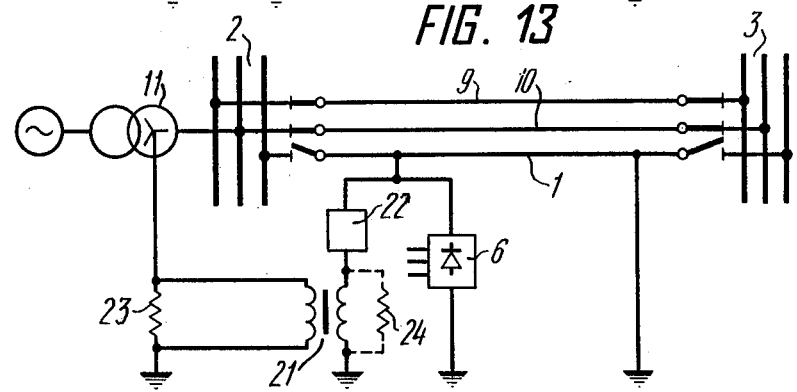
FIG. 14 is a schematic circuit diagram of an embodiment of an automatically adjustable commercial frequency voltage source.

FIG. 14 shows a concrete example of automatic adjusting of the magnitude of the phase of the voltage source. It becomes possible due to the rigid tie between the current magnitude and phase in the neutral wire of the transformer (autotransformer) 11 coupled to the operating phases of the heated line and the induced current in the disconnected conductor 1 of the overhead line. A single-phase transformer 21 is used as the voltage source. The secondary winding of the transformer 21 is connected in series with a filter 22. The primary winding is connected in tandem with the circuit of the grounded neutral wire of said transformer 11, and device 23 is connected parallel thereto, said device 23 being turned on in the absence of melting. After the circuit is made up and direct-current voltage is supplied to the rectifier 6, the device 23 is cut off and the induced current is forcibly shorted through the filter 22. The ratio of transformation of the single-phase transformer 21 is equal to the ratio of the current in the neutral wire of the transformer 11 to the induced current in the conductor 1.

It is important to point out that the required power of the voltage source connected in series with the filter is not as a rule over 10–15 kwt. In this case the installed power of the filter elements can be reduced manyfold.

Since there exists a phase shift between currents in the conductor 1 and the neutral wire of the transformer 11 owing to the effect of the effective resistance of the conductor 1, it is advisable to connect a complex load 24 parallel to the secondary winding of the transformer 21 in order to reduce the current flow to the circuit of the rectifier 6. The nature of the load 24 is conditioned by the nature of the unbalance of the elements of the concrete filter. In each case parameters of the load 24 are defined by means of calculations.

What is claimed is:

1. A device for melting icing by direct current through the conductors of an overhead power transmission line featuring transformers with grounded neutral wires connected thereto, comprising: a rectifier connected for the ice melting period by its direct-current voltage lead-out wires to at least one disconnected conductor of the power transmission line and a grounding circuit; and a commercial frequency circuit filter connected parallel to the direct-current voltage lead-outs of said rectifier.

2. A device as claimed in claim 1, wherein said commercial frequency current filter is made up of at least one reactor and at least one capacitor connected in series.

3. A device as clamed in claim 2, wherein said current filter includes a discharger coupled parallel to either said reactor or said capacitor.

4. A device as claimed in claim 3, wherein said current filter includes a switchgear device connected parallel thereto and turned on when current appears in the circuit of said discharger.

5. A device as claimed in claim 2, wherein the current filter includes a transformer whose primary winding is connected in series with said at least one capacitor and said at least one reactor is connected into the circuit of the secondary winding.

6. A device as claimed in claim 1, wherein at least one resistance is connected between the lead-outs of said current filter and the direct-current voltage lead-outs of said rectifier.

7. A device as claimed in claim 1, wherein a resistance is connected between the potential lead-out of said rectifier and the point where said filter is coupled to the power transmission line.

8. A device as claimed in claim 6, wherein said resistance is connected between the lead-out of said rectifier and the grounding circuit.

9. A device as claimed in claim 6, comprising two resistances of which one is connected between the potential lead-out of said rectifier and said current filter and the other resistance is connected between the other lead-outs of the rectifier and the grounding circuit.

10. A device as claimed in claim 6, wherein reactors are used as resistances.

11. A device as claimed in claim 6, wherein conductors and cables of other overhead power transmission lines are used as resistances.

12. A device as claimed in claim 11, wherein said rectifier is installed at a supply substation far from the substation to which said power transmission line is connected for the ice melting, conductors, as well as cables of lines joining said substations, being used as said resistances.

13. A device as claimed in claim 11, wherein said rectifier and said current filter are installed at a supply substation far from the substation to which said power transmission line is connected for the ice melting, one of the conductors joining the substations of the line being used as said resistance and as conductors feeding direct current to the ice melting line, one end being grounded on the side of the substation to which said power transmission line is joined and the second end being coupled to a pole of the rectifier, the potential lead-out of said rectifier being connected to the ice melting line via other conductors of the coupling line.

14. A device as claimed in claim 1, wherein said current filter includes a source of commercial frequency voltage which can be adjusted as to phase and magnitude connected in series into the circuit of said filter.

15. A device as claimed in claim 14, wherein a second winding of a single-phase transformer serves as the source whose commercial frequency voltage can be adjusted in phase and magnitude, the primary winding thereof being connected to the neutral wire of the high-voltage winding of said transformer coupled to two phases of the heated overhead power transmission line and to the grounding circuit.

16. A device as claimed in claim 15, wherein a matching complex load is connected parallel to said secondary winding of the single-phase transformer, which is coupled in series to the circuit of the commercial frequency current filter.

* * * * *